(12) United States Patent
Chiasson et al.

(10) Patent No.: US 11,801,918 B2
(45) Date of Patent: Oct. 31, 2023

(54) METHOD FOR HANDLING A CATCH FROM A FISHING BOAT

(71) Applicant: CUBE AUTOMATION INC., Tracadie-Sheila (CA)

(72) Inventors: Roch Chiasson, Tracadie-Sheila (CA); Marius Duguay, Shippagan (CA); Louis DeGrace, Tracadie-Sheila (CA); Wesley Stewart, Tracadie-Sheila (CA)

( * ) Notice: Subject to any disclaimer, the term of this patent is extended or adjusted under 35 U.S.C. 154(b) by 0 days.

(21) Appl. No.: 16/545,289

(22) Filed: Aug. 20, 2019

(65) Prior Publication Data
US 2020/0055571 A1 Feb. 20, 2020

(30) Foreign Application Priority Data

Aug. 20, 2018 (CA) ..................... 3014976

(51) Int. Cl.
| | |
|---|---|
| *B63B 27/10* | (2006.01) |
| *A01K 99/00* | (2006.01) |
| *B63B 35/24* | (2006.01) |
| *B63B 25/04* | (2006.01) |
| *B63B 25/28* | (2006.01) |

(52) U.S. Cl.
CPC .............. *B63B 27/10* (2013.01); *A01K 99/00* (2013.01); *B63B 25/04* (2013.01); *B63B 25/28* (2013.01); *B63B 35/24* (2013.01)

(58) Field of Classification Search
CPC ......... B63B 35/24; B63B 27/10; B63B 35/04; B63B 25/04
USPC ......................................... 414/217
See application file for complete search history.

(56) References Cited

U.S. PATENT DOCUMENTS

| | | | | |
|---|---|---|---|---|
| 2003/0156928 A1* | 8/2003 | Sackett | ............ | H01L 21/67769 |
| | | | | 414/217 |
| 2007/0081879 A1* | 4/2007 | Bonora | ............ | H01L 21/67769 |
| | | | | 414/217 |

* cited by examiner

*Primary Examiner* — Saul Rodriguez
*Assistant Examiner* — Willie Berry, Jr.

(57) ABSTRACT

The present invention provides a method for handling the content of a catch from a fishing boat comprising the steps of providing a sorting table having crate handling platforms and installing crates on these platforms. The method also has the step of replacing a full crate with an empty crate and placing the full crates on a crate handling frame which frame can be secured within vertical storage containers.

13 Claims, 14 Drawing Sheets

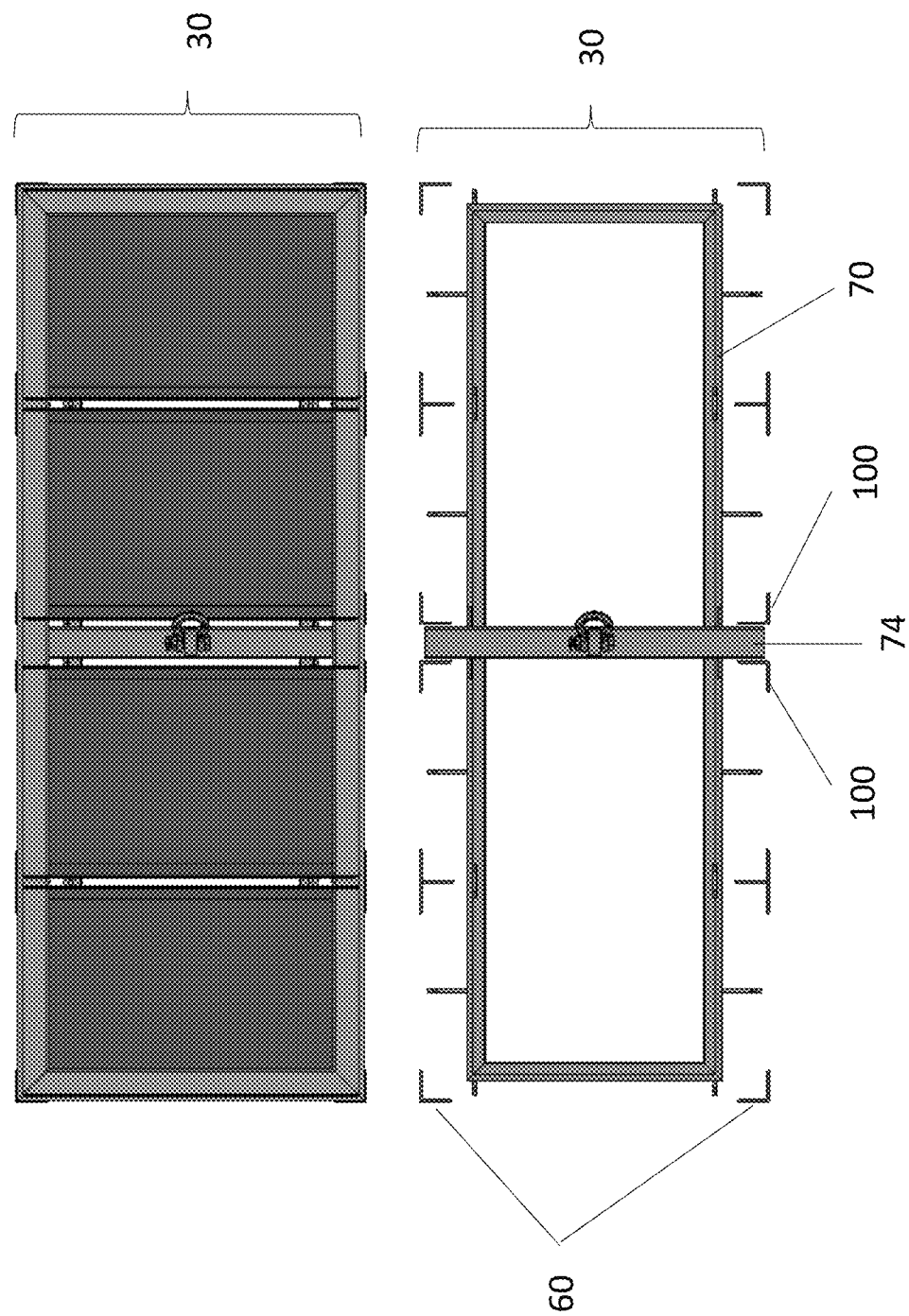

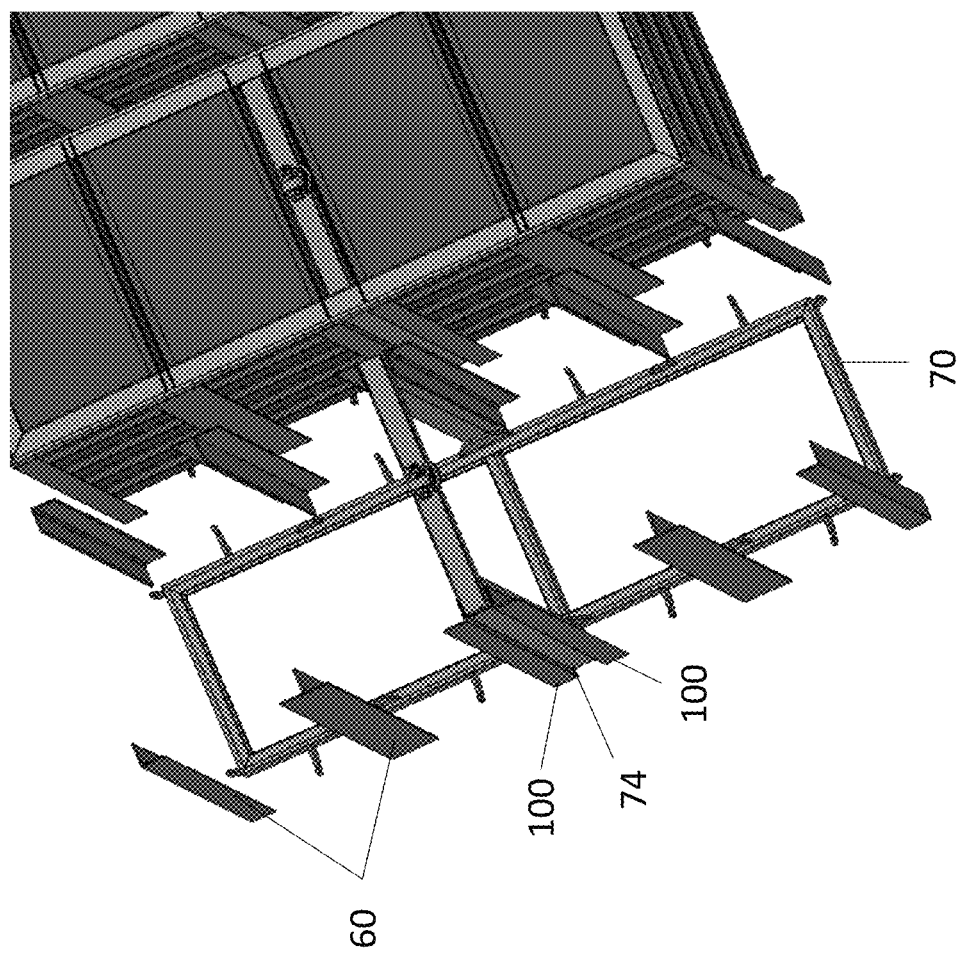

METHOD FOR HANDLING A CATCH FROM A FISHING BOAT

FIELD OF THE INVENTION

The present invention pertains to a method for the fishing industry and more specifically to a method for handing a catch from a fishing boat.

BACKGROUND OF THE INVENTION

The fishing industry has developed a number of different methods to handle a catch from a fishing boat. For example, the crab fishing industry has for a number of years used the following method to handle crabs caught in a trap:
a) catch the crab in a pot and bring to the surface to a fishing boat;
b) sort the crab on the fishing boat;
c) store all crabs in a massive storage container within the hull of the fishing boat;
d) unload the crab from the storage containers at the dock into massive containers.

The use of such a method provides a number of undesired results such as waste with crabs dying and also requiring the crab to be handle by a person on a number of occasions in order to deliver the crab to a seafood processing plant.

There is therefore a need for a more efficient method to handle the content of a catch from a fishing boat such as crab.

SUMMARY OF THE INVENTION

The present invention provides a method for sorting a catch from a fishing boat.

In a first aspect, the present invention provides a method for handling the content of a catch from a fishing boat comprising the steps of first providing a sorting table having crate handling platforms. The method also has the step of placing empty crates on the crate handling platforms and replacing a full crate on the crate handing platforms with an empty crate. The method further comprises the step of placing a full crate on a crate handling frame allowing for crates to be stacked and securing the full crates within a vertical storage container.

BRIEF DESCRIPTION OF THE DRAWINGS

The embodiments of the present invention will now be described by reference to the following figures, in which identical reference numerals in different figures indicate identical elements and in which:

FIG. 9 is a top view of a crate handling frames positioned within vertical storage compartments as would be used in the method of the present invention;

FIG. 10 is a perspective view of a crate handling frames positioned within vertical storage compartments as would be used in the method of the present invention;

The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

DETAILED DESCRIPTION OF THE INVENTION

With reference to FIGS. 1-12 and according to one embodiment of the present invention, a method for handling the content of a catch from a fishing boat will be described. The various components used are to illustrate the implementation of the method according to the present invention. For the purpose of this method the term catch is defined as encompassing any a type of catch a fishing boat can catch such as crab, lobster, or fish for example. A worker skilled in the relevant art would be able to use the current method and adapt to the nature of the catch from a fishing boat.

In order to clearly described the method of the present invention, the steps involved in order handle a catch such as crab will be described. The steps of a fishing boat traveling to and from a dock are clearly not part of this method. The steps of placing any content into a trailer or on a dock are also not part of this method since these are not novel.

Figure 1:
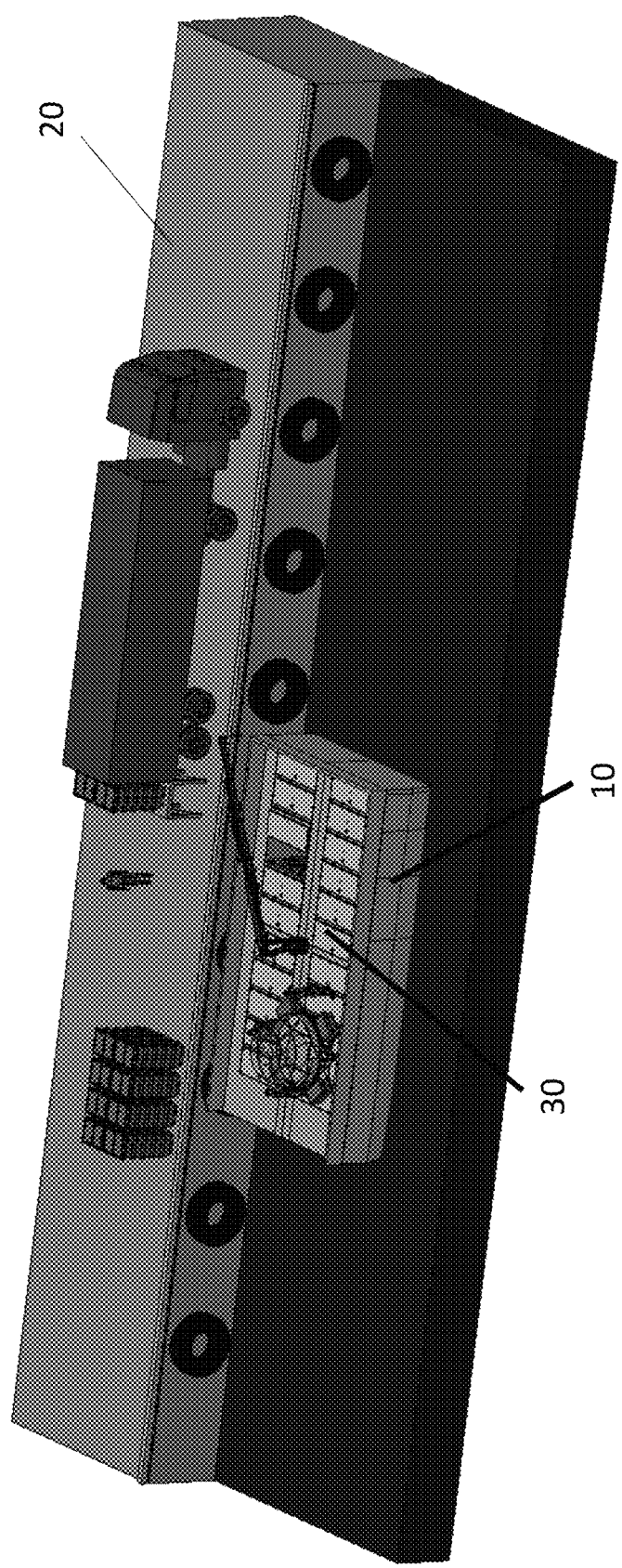
FIG. 1 is a perspective view of a partial hull at a dock which would be used in the method of the present invention.
Figure 2:
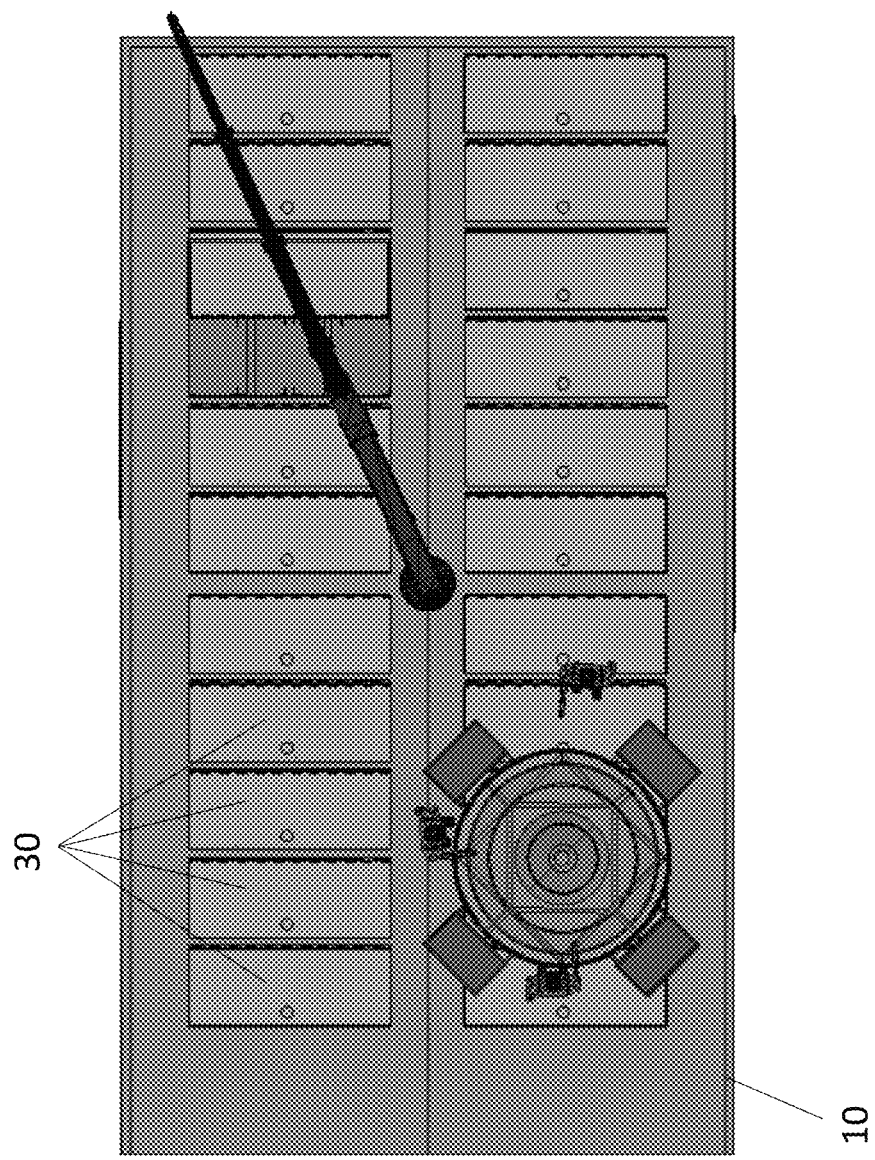
FIG. 2 is a top view of a partial hull with hatches on vertical storage compartments used in the method of the present invention.

With reference to FIGS. 1 and 2 and according to the present method, a partial hull 10 of a fishing boat is shown at a dock 20. The partial hull 10 consist of the stern portion of a fishing vessel which such partial hull could be adapted to any fishing boat. The partial hull used for this method will be based on the size of the boat which will determine the number of crates which can be stored within the vertical storage compartment described below. The partial hull 10 consist of a number of vertical storage compartments 30 which are sealed off by deck plates located on the bridge deck of partial hull 10. As shown in FIG. 1, a total of 22 vertical storage compartments 30 are shown.

Figure 3:
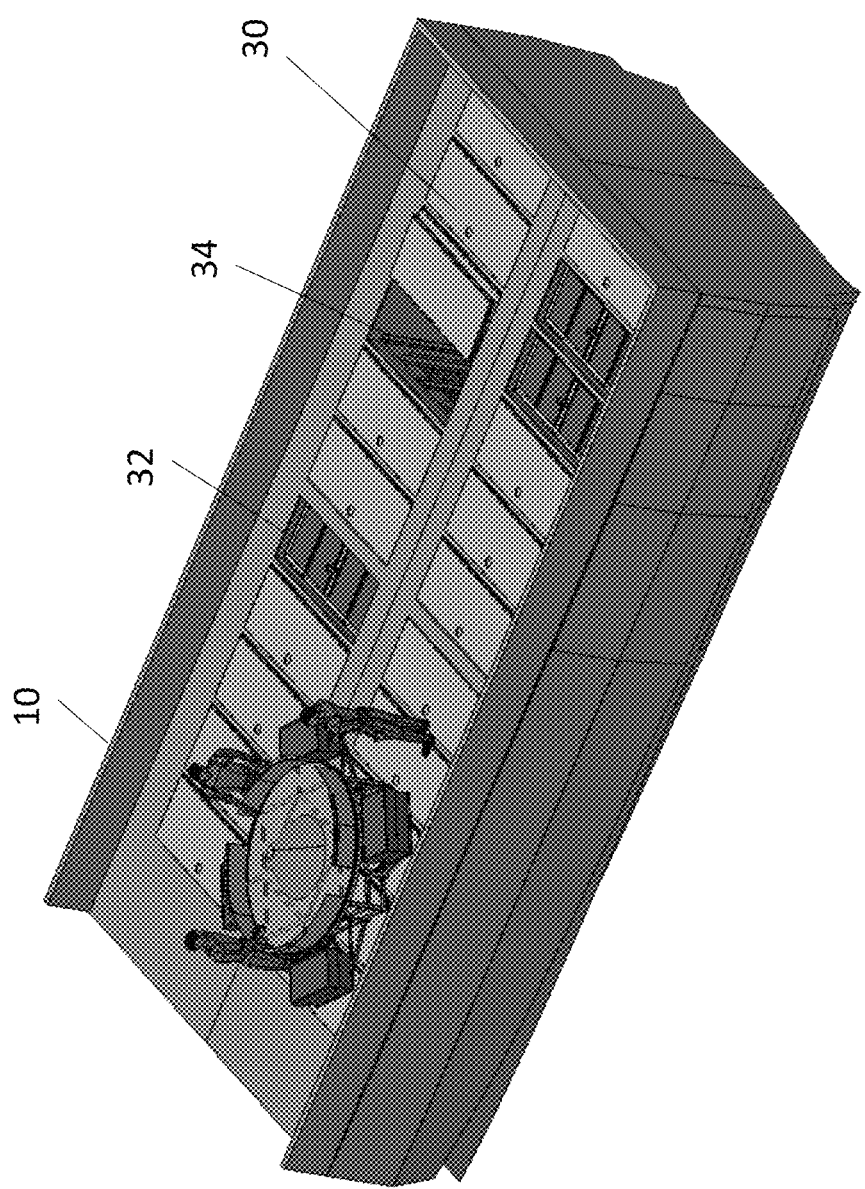
FIG. 3 is a perspective view of a partial hull having certain vertical storage compartments with hatches or the hatch has been removed or opened as would be used in the method of the present invention.
Figure 4:
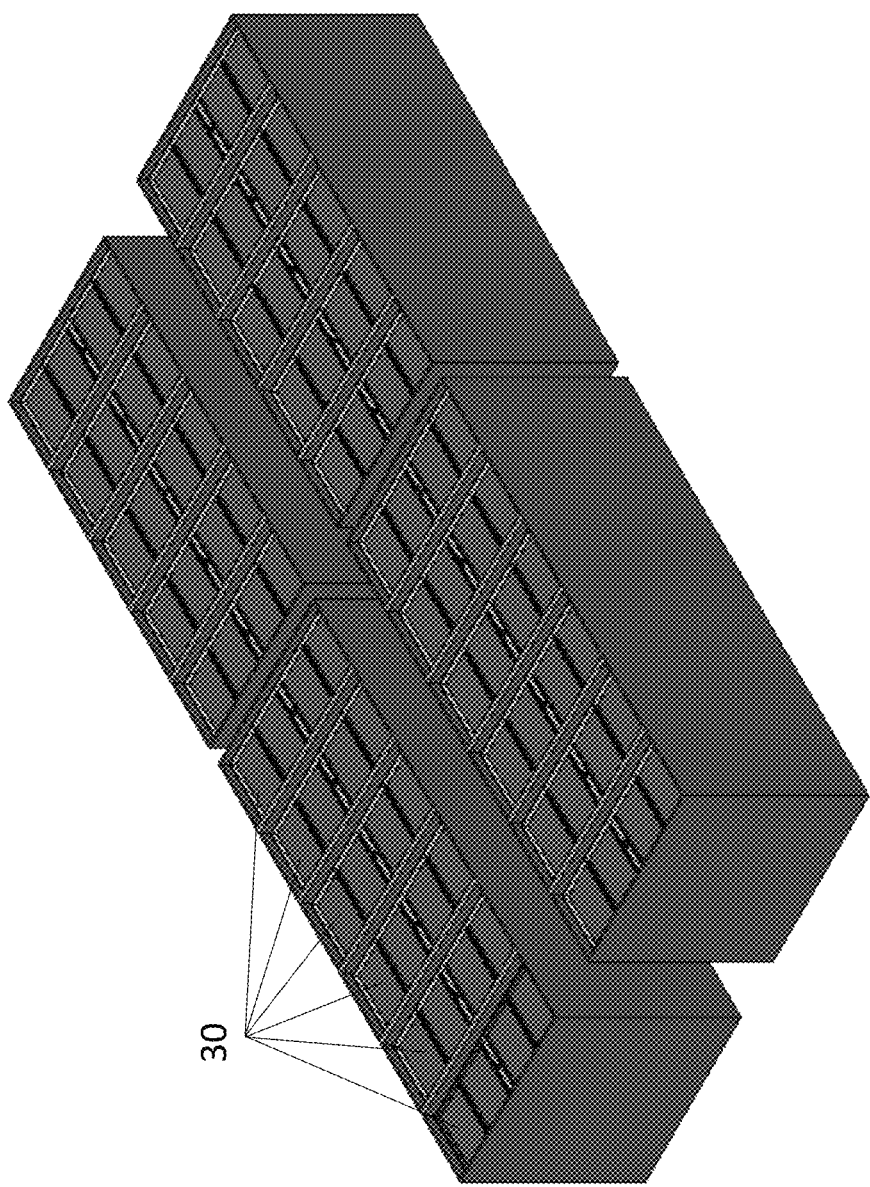
FIG. 4 is a perspective view of a configuration of vertical storage compartments used in the method of the present invention.

With reference to FIGS. 3 and 4 and according to one version of the present method, the partial hull 10 is shown with some vertical storage compartments 30 having the hatch removed 32 or opened 34 in order to illustrate the placement of crate handling frames with crates in the vertical storage compartments. The vertical storage compartment 34 having the hatch opened is shown as being empty without any cargo in the compartment. With specific reference to FIG. 4, a layout of 22 vertical storage compartments 30 is shown. The vertical storage compartments 30 are divided into four sections in the present version of this method, however, the use of four sections is not a requirement in order to implement the method of the present invention.

Figure 5:
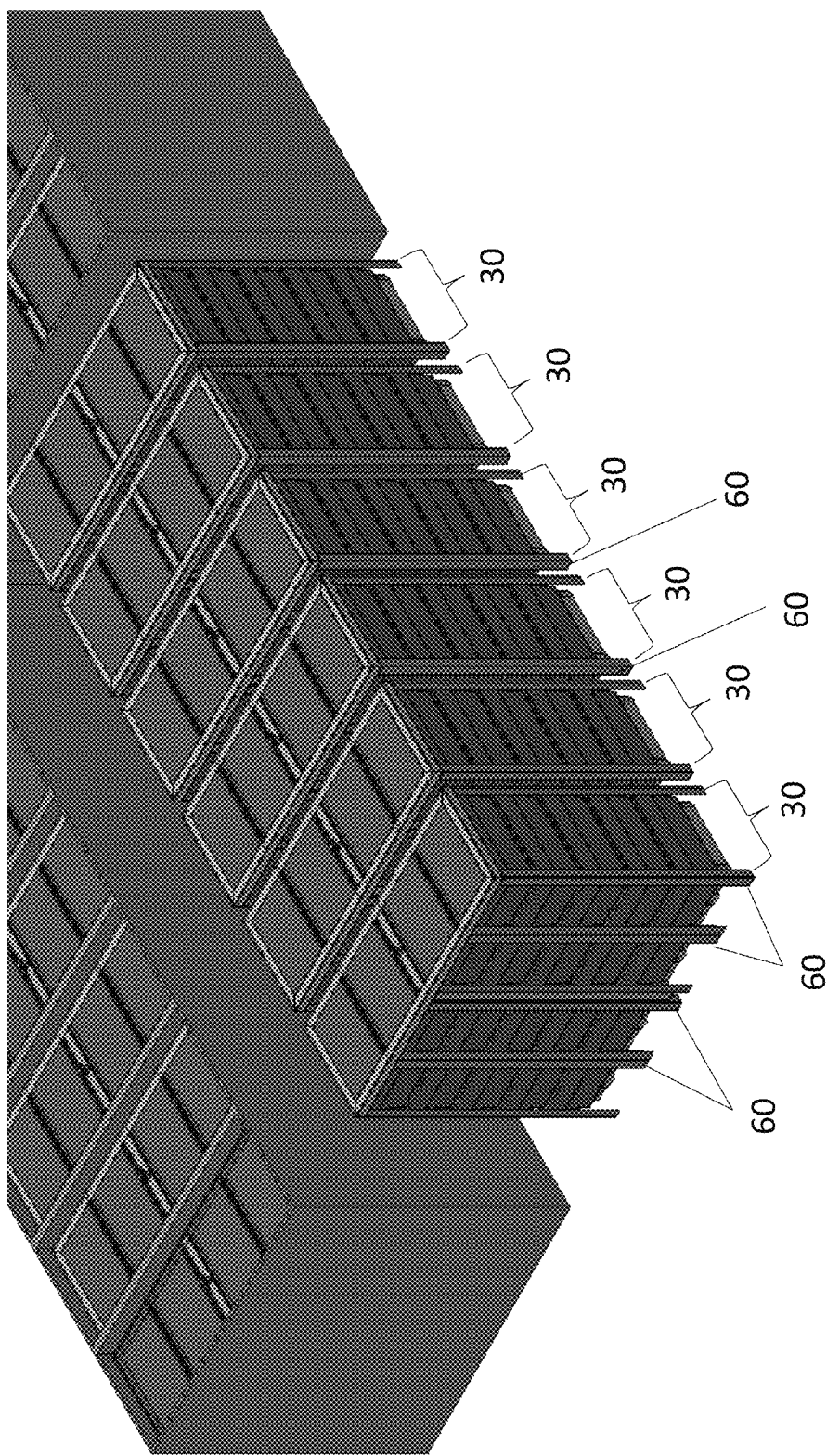
FIG. 5 is a perspective view of vertical storage compartments within guiding rails as used in the method of the present invention.

With reference to FIG. 5 and according to one embodiment of the present method, some vertical storage compartments 30 are shown within a guide system comprised of guiding rails allowing for the placement of crate handling frames within the vertical storage compartments. Each vertical storage compartment is independent from an adjacent vertical storage compartment. The guiding rails 60 are in a vertical position allowing for the contents of the vertical storage compartments to be removed or placed within the storage compartment in a vertical manner.

Figure 6:
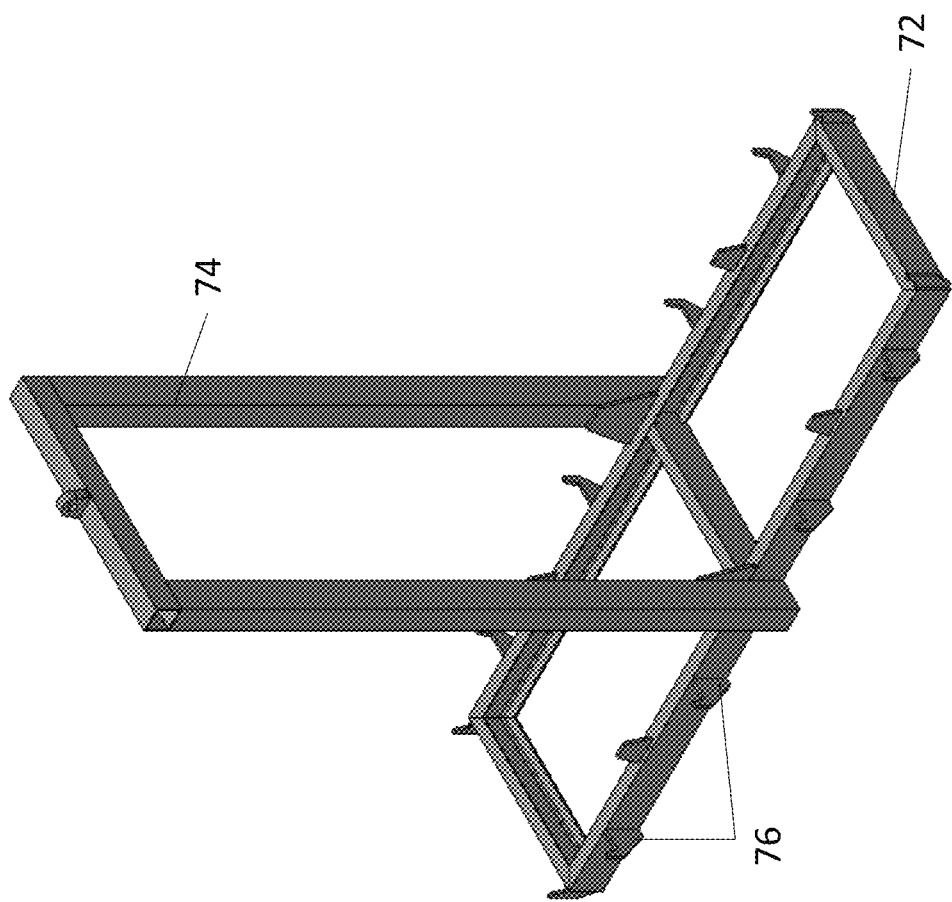
FIG. 6 is a perspective view of a crate handling frame as used in the method of the present invention.
Figure 7:
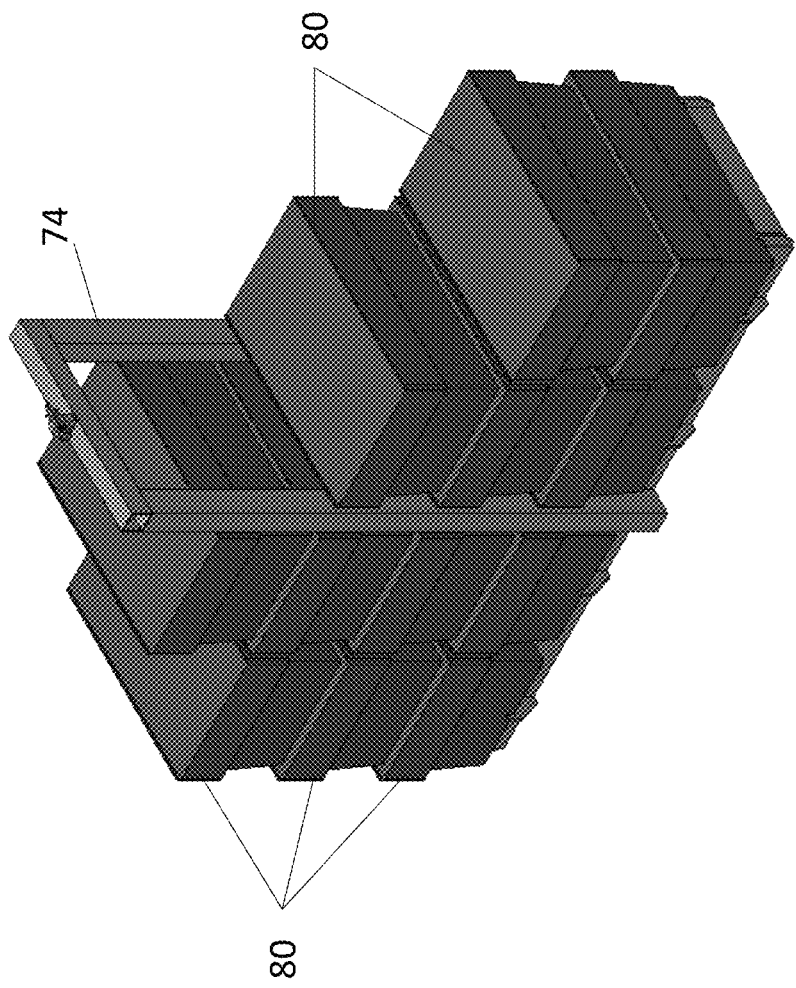
FIG. 7 is a crate handling frame having crates stacked onto the frame as used in the method of the present invention.
Figure 8:
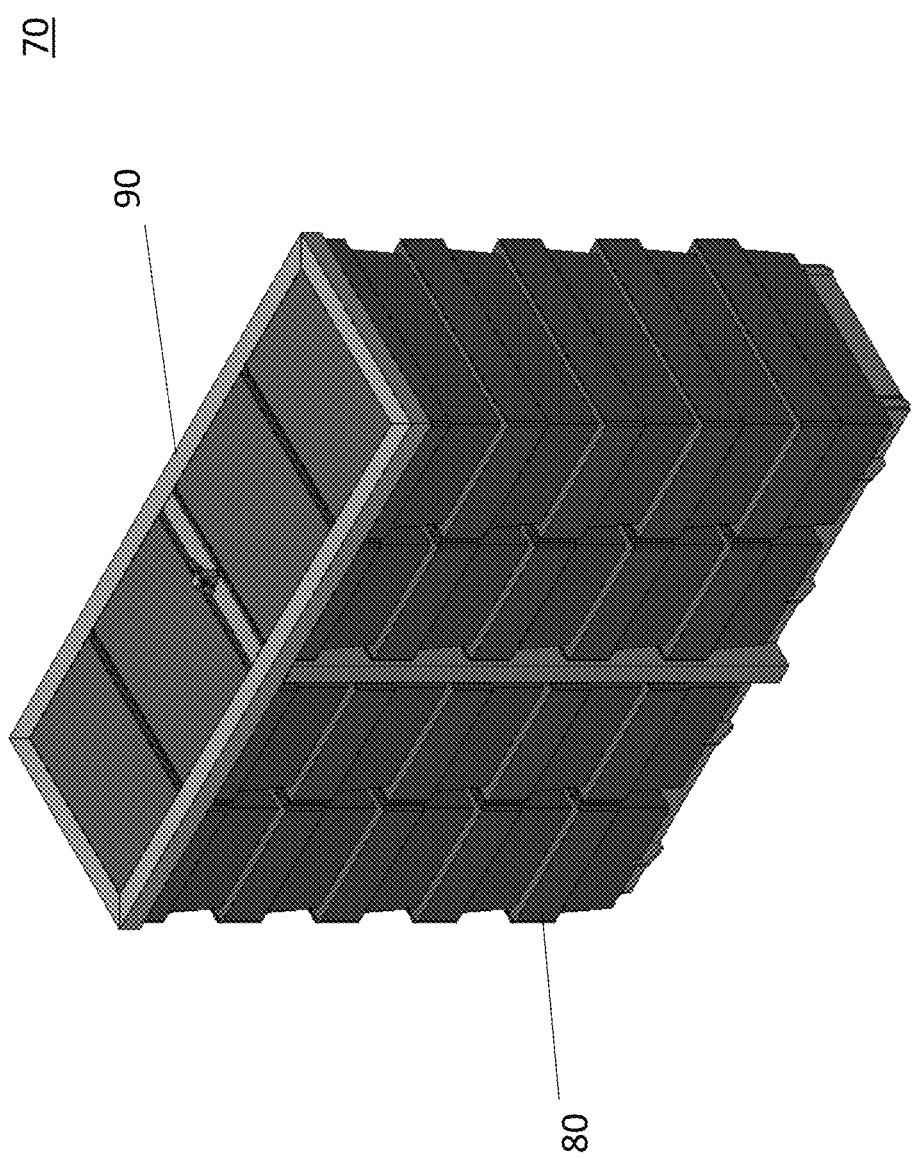
FIG. 8 is a perspective view of a crate handling frame having the maximum number of crates which can be placed onto the frame as used in the method of the present invention.

With reference to FIGS. 6 and 7 and according to one embodiment of the present method, a crate handling frame 70 is shown for use in the present method. The crate handling frame has a bottom portion 72 for receiving fishing crates (not shown) in FIG. 6. The crate handling frame also has a central transport member 74 allowing for the displacement of the crate handling frame 70 through a crane for example. The bottom portion 72 has restricting plates 76 allowing to secure a crate within the crate handling frame 70. With specific reference to FIG. 7, known fishing crates 80 are positioned within the crate handling frame 70 allowing for the crates 80 to be stacked one on top of another. Crates 80 have guides on the bottom and top portions allowing to stack the crates to one another With reference to FIG. 8 and according to one embodiment of the present method, a crate handling frame 70 is shown having a maximum of 20 crates 80 positioned on the frame 70. In this configuration, the crates 80 are secured at the top through securing frame 90 which is required in order to displace frame 70 with the crates 80. The number of crates which can be secured onto a crate handling frame 70 is determined by the configuration of the hull design which impacts the number of handling frame which can be loaded into the hull.

With reference to FIGS. 9 and 10 and according to one embodiment of the present method, a crate handling frame 70 is shown positioned within a vertical storage compartment 30 having guiding rails 60. Central transport member 74 is positioned within frame guiding rails 100 securing central transport frame 70 within the vertical storage compartment 30 for example. The crate handling frame 70 is designed to be moveable within the vertical storage compartment of the present method.

Figure 10A:
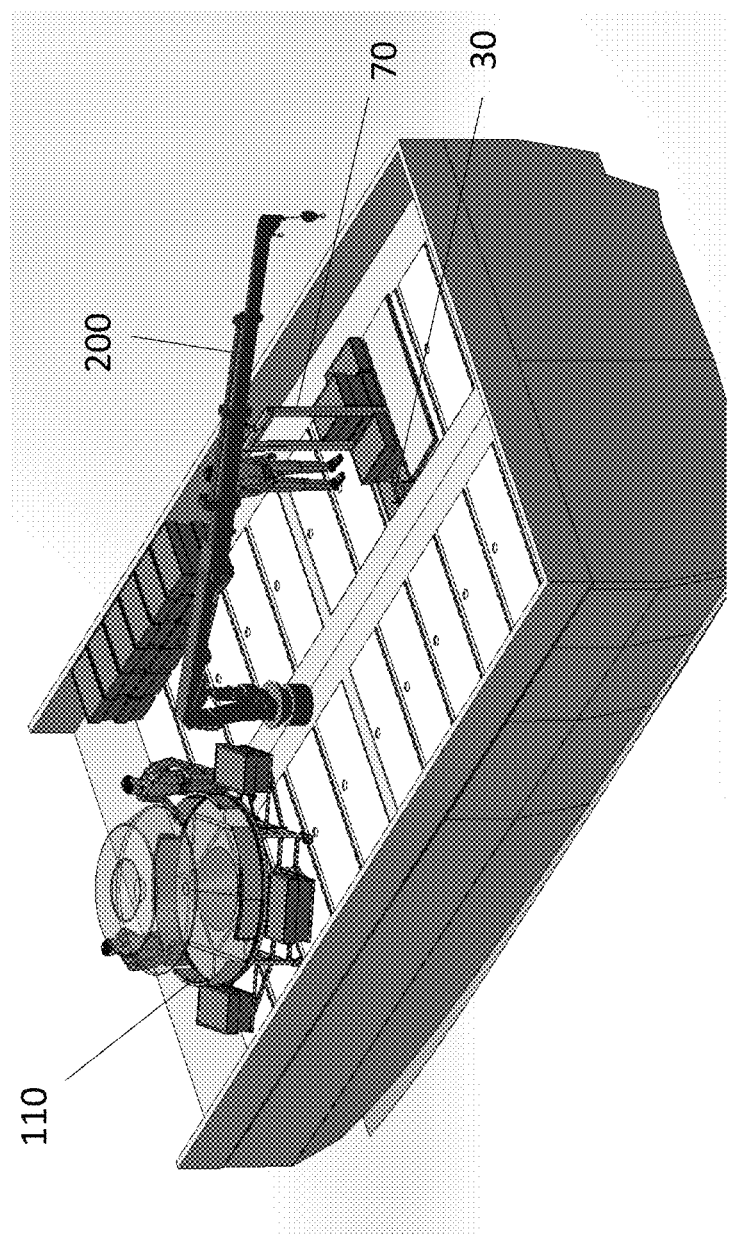
FIG. 10A is a perspective view of a crane raising a crate handling frame within a vertical storage compartment as would be used in the method of the present invention.
Figure 10B:
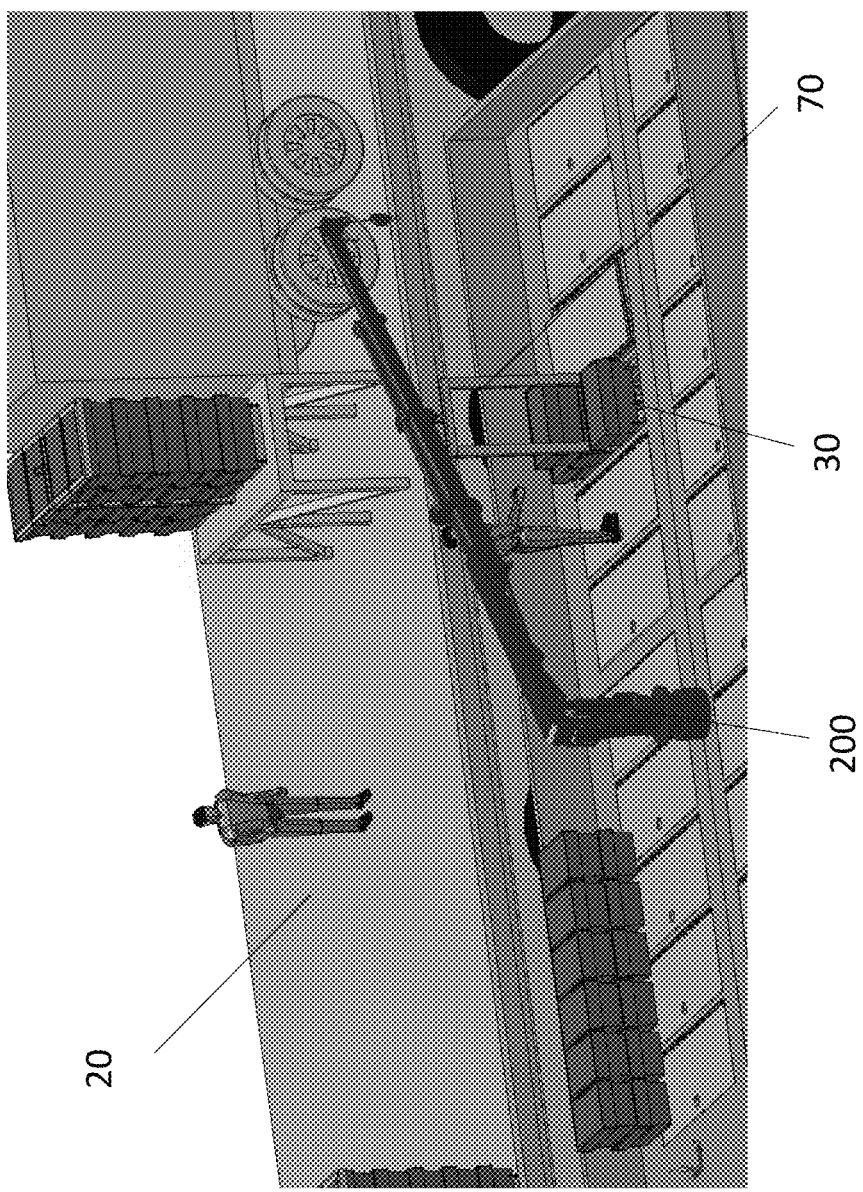
FIG. 10B is a perspective view of a crane raising a crate handing frame within a vertical storage compartment for placement on a deck as would be used in the method of the present invention.

With reference to FIGS. 10A and 10B and according to one embodiment of the present method, a crate handling frame 70 is shown being hoisted from a vertical storage compartment 30 by crane 200. Under this method, the crate handling frame 70 remains within the vertical storage compartment 30 while being progressively lifted allowing an individual to retrieve a crate 80 for use on the sorting table 110. While at sea it is desirable to keep the crate handling frame 70 within the vertical storage compartment 30 when retrieving or storing crates 80 on the crate handling frame. This is achieved with crane 200 which is capable of raising and lowering a crate handling frame within a vertical storage compartment while allowing the crate handling frame to remain within a vertical storage compartment. With specific reference to FIG. 10B and according to additional steps in the present method, crane 200 allows the retrieval of crate handling frames within vertical storage compartments 30 and subsequent placement on a dock 20 for transport to a processing facility. The placement of crane 200 on a bridge will be determined by the number of vertical storage compartments positioned in the hull. Proper reinforcement of the crane 200 will be required within the hull of the vessel to assure crane 200 can performed all tasks required and more specifically allowing to retrieve crate handling frames from all vertical storage compartments in the hull. Crane 200 can be designed to have an extendable and retractable boom as well as allowing the boom to be raised and lowered.

Figure 11:
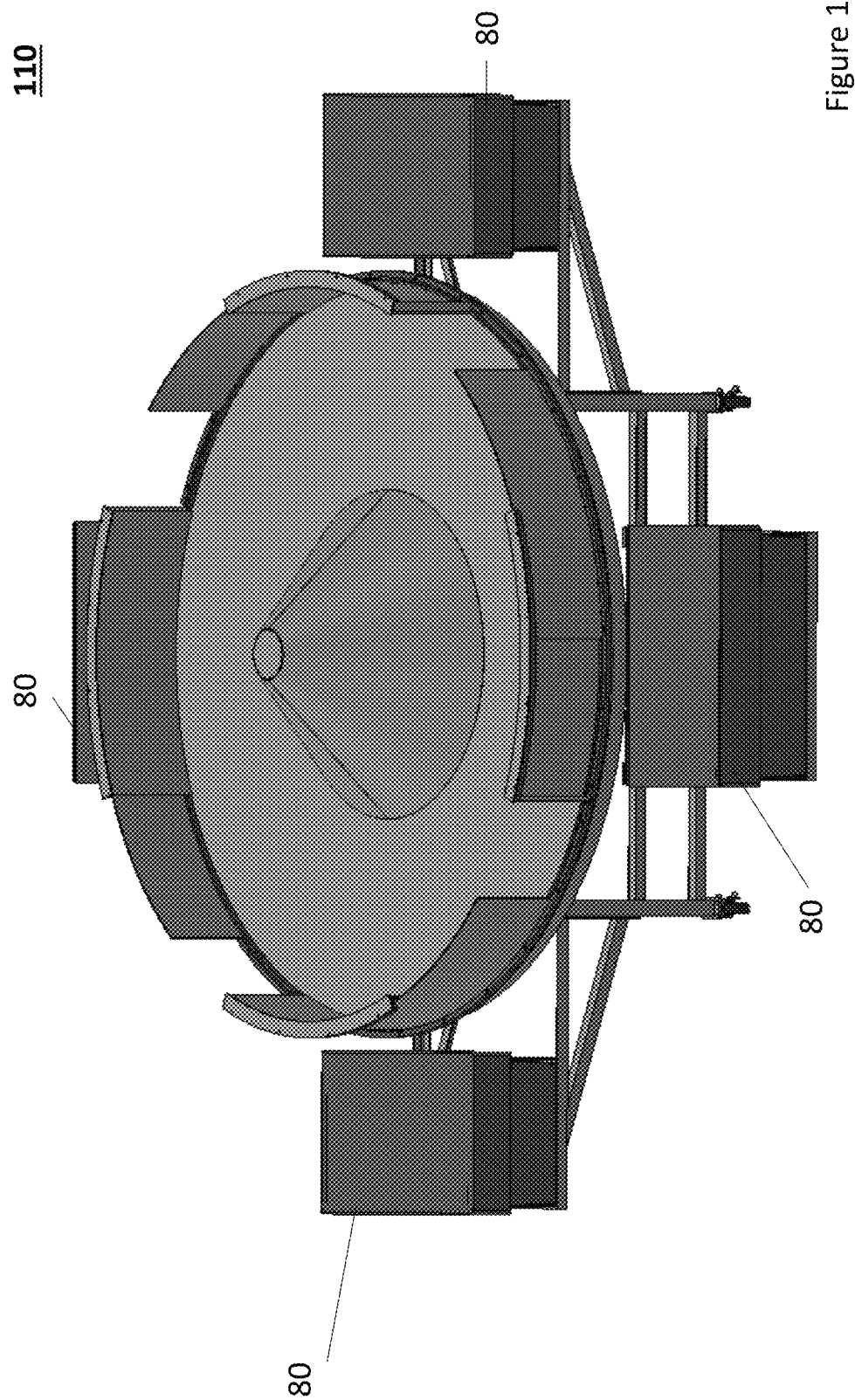
FIG. 11 is a perspective view of a sorting table used in the method of the present invention.
Figure 12:
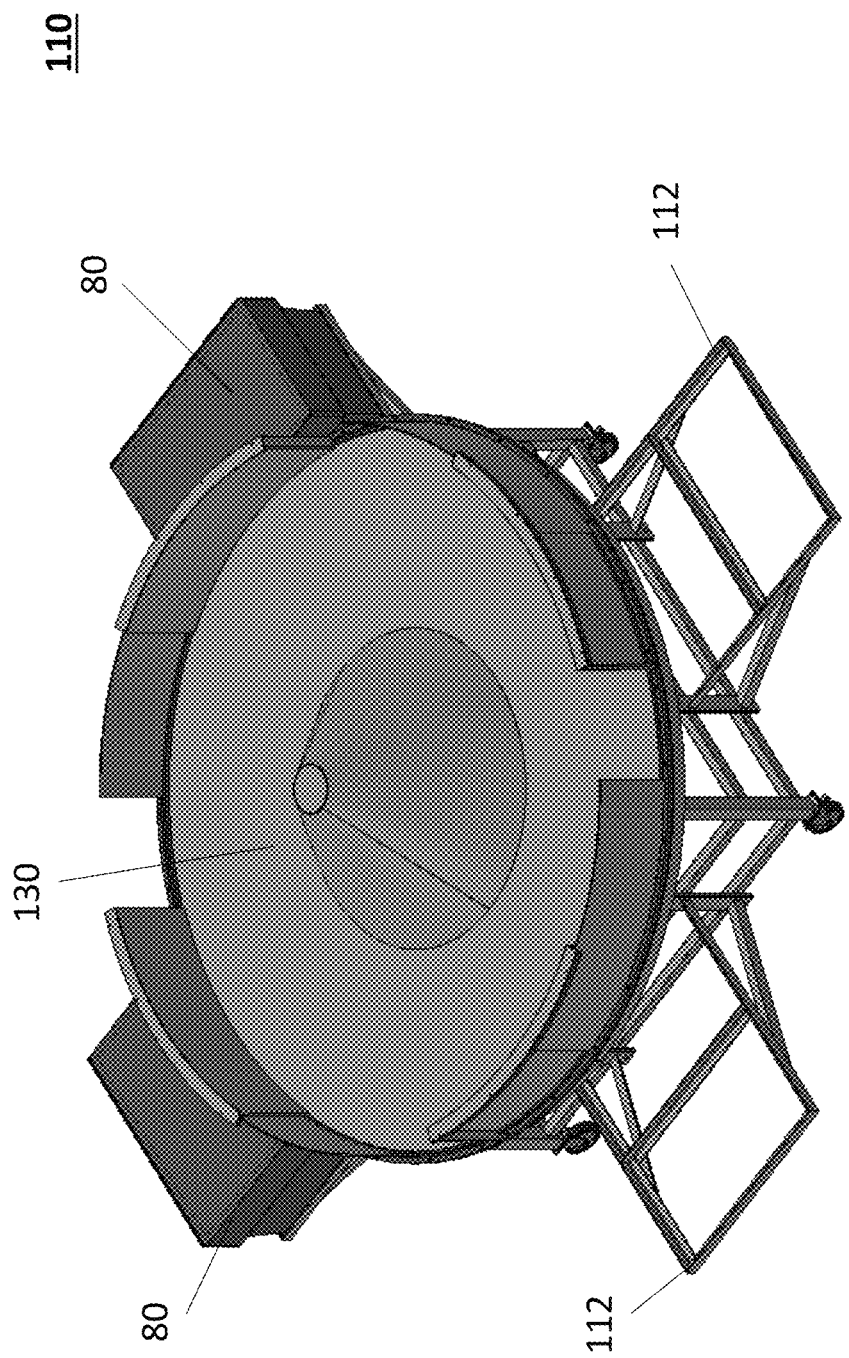
FIG. 12 is a perspective view of a sorting table with crate handling platforms shown without a crate positioned on the platform as would be used in the method of the present invention.

With reference to FIGS. 11 and 12 and according to one embodiment of the present invention, a sorting table 110 is shown. The sorting table 110 has four crate handling platforms 112 for receiving crates 80. The sorting table has a crab sorting area 130 allowing for a catch such as crab to be unload in this area. Once unloaded an individual can place crab within a crate 80 if the crab is within the approved fishing norm. Once crate 80 is full an empty crate can be placed onto the crate handling platform which is either on the deck surface or within the vertical storage compartment. In one embodiment the crate handling frame remains secured in the vertical storage compartment for security at sea. The frame is raised and lowered within the vertical storage compartment with the base of the frame remaining within the vertical storage compartment. The sorting table 110 allows for easy placement and removal of crates onto the crate handling platforms as described in the present method when the crate is full or when the crate handling platform is empty. The crates 80 as shown have a cover which can be opened.

The crates will also have a system allowing to trace a crate at any given time either from the departure from the dock, into the vertical storage compartment, on the deck or in transit to the processing facility. In one embodiment of the present invention, a tracing system will consist of the following steps:
a) Scanning crate when placed on sorting table-scan will establish tracking information such as the date, time, location of the crate which in turn will be attributed to the catch placed in the specific crate; and
b) Scanning crate upon arrival at processing plant This tracing method will allow to keep accurate information on the catch and delivery to the processing plant as well as to consumers.

Based on the various components described in the present invention, a method for handling the content of a catch from a fishing boat can be implemented as follows:
a) providing a sorting table having crate handling platforms;
b) Placing empty crates on the crate handling platforms of the sorting table;
c) Placing a catch such as crab on a sorting table for sorting by individuals;
d) Placing full crates within a crate handling frame; and
e) Securing the full crates in the crate handling frame to be stored in a vertical storage compartment.

In another embodiment, the present invention provides a method as follows:

a) Providing a sorting table having crate handling platforms;
b) Removing an empty crate from a crate handling frame positioned within a vertical storage compartment and placing the crate on a crate handling platform;
c) Providing a catch onto the sorting table for sorting into an empty crate;
d) Sorting catch into an empty crate;
e) Replacing a full crate on a crate handling platform with an empty crate; and
f) Placing the full crate on the crate handling frame positioned within the vertical storage compartment;

The method of the current invention could also include further steps such as:

Scanning the empty crate placed on the crate handling platforms.

Removing a crate handling frame from the vertical storage compartments and allowing the crate handling frame to be positioned within a shipping container on a dock.

Scanning the crate upon delivery to a processing plant to provide tracking information.

The method described above reduces the amount of times a catch is handled by an individual since the method of the present invention only requires an individual to handle the catch once when placing into a crate. In other methods currently in use in the fishing industry a crab, for example, will first be handled by an individual on a sorting table and then either directly placed into a storage compartment of a ship or within a container to then be unloaded into the storage container of the ship. Once at the dock, the crab will then need to be handle another time in order to transfer the crab from the hull storage into a container for weighing/scaling the catch. The catch is then transferred again into a larger container mixed with ice. Then the larger container is shipped to a processing plant. The method of the present invention only requires a crab, for example, to be handled once when placing in a crate. The crab will then only be handled next by an individual when it arrives at the processing plant and is removed from the crate. The other current methods require the crab to be handled at least two or three time before reaching the processing plant which methods impact the quality and survivability of the crab.

A person understanding this invention may now conceive of alternative structures and embodiments or variations of the above all of which are intended to fall within the scope of the invention as defined in the claims that follow.

We claim:

1. A method for handling the content of a catch from a fishing boat comprising:
   providing a sorting table having crate handling platforms and a sorting area for manually sorting the catch from the fishing boat;
   installing empty crates on the crate handling platforms;
   scanning a crate when placed on the sorting table;
   replacing a full crate on the crate handling platforms with an empty crate;
   placing the full crates on a crate handling frame allowing for crates to be stacked; and
   securing the full crates within a vertical storage container.

2. The method of claim 1, further comprising scanning at least one of the full crates upon delivery to a processing plant.

3. The method of claim 1, wherein the sorting table further comprises a central conical structure.

4. The method of claim 1, wherein the crate handling frame comprises a bottom portion for receiving the full crates.

5. The method of claim 4, wherein the bottom portion of the crate handling frame comprises at least one restricting plate for securing the full crates to the crate handling frame.

6. The method of claim 1, wherein the crate handling frame comprises a central transport member.

7. The method of claim 1, wherein the vertical storage container comprises at least one guiding rail.

8. The method of claim 1, further comprising unloading the catch on the sorting area.

9. The method of claim 1, further comprising transferring the catch from the sorting area to at least one of the empty crates.

10. A method for handling the content of a catch from a fishing boat comprising:
    providing a sorting table having crate handling platforms and a sorting area for manually sorting the catch from the fishing boat;
    installing empty crates on the crate handling platforms;
    replacing a full crate on the crate handling platforms with an empty crate;
    placing the full crates on a crate handling frame allowing for crates to be stacked;
    securing the full crates within a vertical storage container; and
    removing the crate handling frame from the vertical storage container.

11. The method of claim 10, wherein, upon removal from the vertical storage container, the crate handling frame is transferred to a dock.

12. A method for handling the content of a catch from a fishing boat comprising:
    providing a sorting table having crate handling platforms and a sorting area for manually sorting the catch from the fishing boat;
    installing empty crates on the crate handling platforms;
    replacing a full crate on the crate handling platforms with an empty crate;
    placing the full crates on a crate handling frame allowing for crates to be stacked;
    securing the full crates within a vertical storage container; and
    allowing the crate handling frame to be positioned within a shipping container.

13. The method of claim 12, further comprising transporting the shipping container with the crate handling frame positioned therein to a processing plant.

* * * * *